(12) United States Patent
Muñoz De La Torre Alonso et al.

(10) Patent No.: US 9,369,393 B2
(45) Date of Patent: Jun. 14, 2016

(54) POLICY SERVER, POLICY ENFORCEMENT DEVICE, AND VARIOUS METHODS FOR DYNAMICALLY EXCLUDING ACTIVE SERVICE ADD-ONS FROM BEARER THROTTLING FOR USER TERMINALS

(71) Applicant: TELEFONAKTIEBOLAGET L M ERICSSON (PUBL), Stockholm (SE)

(72) Inventors: Miguel Angel Muñoz De La Torre Alonso, Madrid (ES); Franco Foresti, Madrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 169 days.

(21) Appl. No.: 14/287,631

(22) Filed: May 27, 2014

(65) Prior Publication Data

US 2015/0350093 A1 Dec. 3, 2015

(51) Int. Cl.
| | |
|---|---|
| *H04L 12/851* | (2013.01) |
| *H04W 8/18* | (2009.01) |
| *H04W 28/24* | (2009.01) |
| *H04L 29/06* | (2006.01) |
| *H04W 28/02* | (2009.01) |
| *H04L 12/14* | (2006.01) |

(Continued)

(52) U.S. Cl.
CPC ...... *H04L 47/2425* (2013.01); *H04L 29/06176* (2013.01); *H04W 8/18* (2013.01); *H04W 28/24* (2013.01); *H04L 12/1407* (2013.01); *H04M 15/64* (2013.01); *H04W 28/0252* (2013.01); *H04W 76/041* (2013.01)

(58) Field of Classification Search
CPC .. H04L 47/2425; H04L 12/1407; H04W 8/18
See application file for complete search history.

(56) References Cited

U.S. PATENT DOCUMENTS

| | | | |
|---|---|---|---|
| 2005/0086316 A1* | 4/2005 | Chen | G06Q 10/107 709/207 |
| 2008/0080402 A1* | 4/2008 | Chang | H04L 67/125 370/270 |

(Continued)

FOREIGN PATENT DOCUMENTS

EP 2 343 853 A1 7/2011

OTHER PUBLICATIONS $3^{rd}$ Generation Partnership Project; Technical Specification Group Core Network and Terminals; Policy and Charging Control (PCC); Reference points (Release 12). 3GPP TS 29.212 v12.4.0 (Mar. 2014).

(Continued)

*Primary Examiner* — Bunjob Jaroenchonwanit

(57) ABSTRACT

A policy server (e.g., Policy and Charging Rules Function), a policy enforcement device (e.g., Policy and Charging Enforcement Function, Traffic Detection Function), and various methods are described herein for dynamically excluding active service add-ons from bearer throttling for user terminals. The active service add-on indicates that bandwidth of the service traffic associated with a corresponding service is to be limited to a defined value after the user terminal consumes a defined amount of data associated with the corresponding service during a defined time period. The bearer throttling entails limiting the bearer bandwidth to the defined value after the user terminal has consumed the defined amount of data during the defined time period.

24 Claims, 11 Drawing Sheets

(51) Int. Cl.
  *H04M 15/00* (2006.01)
  *H04W 76/04* (2009.01)

(56) References Cited

U.S. PATENT DOCUMENTS

2011/0314161 A1* 12/2011 Andreasen .......... H04L 63/0227
                                                      709/226
2012/0117235 A1*  5/2012 Castro Castro ......... H04L 12/14
                                                      709/224

OTHER PUBLICATIONS

3rd Generation Partnership Project; Technical Specification Group Services and System Aspects; Policy and charging control architecture (Release 12). 3GPP TS 23.203 v12.4.0 (Mar. 2014).

3rd Generation Partnership Project; Technical Specification Group Services and System Aspects; Study on Policy solutions enhancements (Release 11). 3GPP TR 23.813 v11.0.0 (Jun. 2011).

Calhoun, et al.: "Diameter Base Protocol". Network Working Group, RFC 3588. Sep. 2003.

* cited by examiner

POLICY SERVER, POLICY ENFORCEMENT DEVICE, AND VARIOUS METHODS FOR DYNAMICALLY EXCLUDING ACTIVE SERVICE ADD-ONS FROM BEARER THROTTLING FOR USER TERMINALS

TECHNICAL FIELD

The present invention relates to a policy server (e.g., Policy and Charging Rules Function), a policy enforcement device (e.g., Policy and Charging Enforcement Function, Traffic Detection Function), and various methods for dynamically excluding active service add-ons from bearer throttling for user terminals.

BACKGROUND

The following abbreviations are herewith defined, at least some of which are referred to within the following description of the prior art and the present invention.
3GPP Third Generation Partnership Project
ADC Application Detection and Control
AVP Attribute Value Pair
CCA Credit Control Answer
CCR Credit Control Request
CE Content Enrichment
DPI Deep Packet Inspection
GB Giga Byte
GGSN Gateway GPRS Support Node
IMSI International Mobile Subscriber Identity
IP Internet Protocol
IP-CAN Internet Protocol Connectivity Access Network
KBPS Kilo Bytes Per Second
MB Mega Byte
MS Mobile Station
MSISDN Mobile Station Integrated Services Digital Network number
PCC Policy and Charging Control
PCEF Policy and Charging Enforcement Function
PCRF Policy and Charging Rules Function
PDN GW Packet Data Network Gateway
PDP Packet Data Protocol
QoS Quality of Service
RAA Re-Authorization Answer
RAR Re-Authorization Request
SAPC Service Aware Policy Controller
SASN Service Aware Support Node
TSR TDF Session Establishment Request
TSA TDF Session Establishment Answer
SPR Subscriber Profile Repository
TDF Traffic Detection Function
UE User Equipment The technical specification 3GPP TS 23.203 "Policy and Charging Control Architecture" (version V12.4.0; March-2014) discloses a Policy and Charging Control (PCC) architecture for use in a telecommunications system which allows among other things the application of charging and policies to the data flows of data sessions of their users. FIG. 1 (PRIOR ART) illustrates one of the PCC architectures 100 disclosed in 3GPP TS 23.203 (version V12.4.0; March-2014) which specifies the PCC functionality for the Evolved 3GPP Packet Switched domain, including both 3GPP accesses (GERAN/UTRAN/E-UTRAN) and Non-3GPP accesses. The PCC architecture 100 comprises these main entities: a Policy and Charging Rules Function 102 (PCRF 102), a Policy and Charging Enforcement Function 104 (PCEF 104), a Gateway 105, and a Traffic Detection Function 106 (TDF 106). Briefly, the PCRF 102 behaves as a Policy Decision Point (PDP), or policy server, which stores user policies and determines which user polices are to be applied in each data session. The network nodes implementing the PCEF 104 and/or the TDF 106 functionalities route data traffic flows to and from end users and behave as Policy Enforcing Points (PEPs) of the user policies. In addition, the PCC architecture 100 comprises an Online Charging System 108 (OCS 108), an Offline Charging System 110 (OFCS 110), a Subscription Profile Repository 112 (SPR 112), an Application Function 114 (AF 114), and a Bearer Binding and Event Reporting Function 116 (BBERF 116). The contents of the aforementioned 3GPP TS 23.203 (version V12.4.0; March-2014) are hereby incorporated by reference herein.

The PCRF 102 and PCEF 104 have between them a Gx reference point which is defined in 3GPP TS 29.212 "Policy and Charging Control Reference Points" (version V12.4.0; March-2014) (the contents of which are incorporated by reference herein). In particular, the Gx reference point is used for the provisioning and removal of PCC rules from the PCRF 102 to the PCEF 104 and the transmission of traffic plane events from the PCEF 104 to the PCRF 102. Plus, the Gx reference point can be used for charging control, policy control or both. The Gx reference point is based on RFC 3588 "Diameter Base Protocol" September 2003 (the contents of which are incorporated by reference herein).

The PCC architecture 100 also implements DPI (Deep Packet Inspection) technology which supports packet inspection and service classification where IP packets in the data sessions of end users are classified according to a configured tree of rules so that they are assigned to a particular service session. DPI has been standardized in 3GPP Rel-11, the so-called TDF 106, which refers to a stand-alone node. The DPI functionality can also run co-located with PCEF 104 for details reference is made to 3GPP TR 23.813 "Study on Policy Solutions and Enhancements" (version V11.0.0; June-2011) (the contents of which are incorporated by reference herein). A new reference point (Sd) has been defined for use between the stand-alone TDF 106 and the PCRF 102.

More specifically, the DPI function classifies IP packets into services and enforcement actions can be performed based on the detected services. One example of an enforcement action is service throttling in which IP packets classified to a certain service are bandwidth limited. It is also possible to throttle or limit the bandwidth of the whole bearer which is referred to herein as bearer throttling. A problem associated with this bearer throttling (bearer bandwidth limitation) and service throttling (service bandwidth limitation) in the current-state-of-the-art is described next with respect to FIG. 2 (PRIOR ART).

Referring to FIG. 2 (PRIOR ART), there is illustrated a basic diagram of a telecommunications system 200 which is used to help explain the problem associated with the current-state-of-the-art in relation to bearer throttling (bearer bandwidth limitation) and service throttling (service bandwidth limitation). The telecommunication system 200 comprises an IP Backbone Core Network 202 (includes a SGSN 204), the gateway 105 (includes the PCEF 104), the PCRF 102, the SPR 112, the TDF 106, and IP networks 206 (internet 206). As shown, the end user's UE/MS 208 connects to the IP Backbone Core Network 202 (includes the SGSN 204) which is connected to the gateway 105 (includes the PCEF 104). The gateway 105 (e.g., GGSN 105) is connected to the PCRF 102 and the TDF 106 respectively by the Gx reference point and a Gi/Sgi reference point. Also, the PCRF 102 is connected to the SPR 112 and the TDF 106 respectively by a Sp reference point and a Sd reference point. The TDF 106 is connected to the IP networks 206 (internet 206) by the Gi/Sgi reference point. It should be appreciated that the telecommunication system 200 includes many other components but for clarity only the components needed to help explain the problem associated with the current-state-of-the-art have been described herein.

As mentioned above, per the current 3GPP PCC functionality the bearer throttling (bearer bandwidth limitation) applies to the whole bearer and the service throttling (service bandwidth limitation) applies to a specific service. In this regard, the operators offer their customers flat tariffs for data access (e.g., a general internet package/bundle). This general internet package/bundle is valid for a certain time period (typically monthly) and typically bearer throttling is applied when the user's UE/MS 208 consumes a certain amount of volume (e.g., limit bearer bandwidth to 128 kbps when the user's UE/MS 208 consumes 1 GB during the monthly period). In addition, to the above general internet package/bundle, the operators offer their customers per service packages/bundles/add-ons (e.g., Facebook add-on, Twitter add-on, TV add-on etc. . . . ). These service add-ons typically have similar characteristics as compared with the general internet package/bundle (e.g., limit Facebook bandwidth to 64 kbps when the user's UE/MS 208 consumes 100 MB of Facebook data during the monthly period).

However, when the user buys a service add-on and the user consumes the data limit for the general internet package but not for the service add-on then a problem occurs where bearer throttling is imposed on all of the user's active services including the service add-on (e.g., Facebook bandwidth is limited even when the user's UE/MS 208 has not consumed the allotted 100 MB of Facebook data during the monthly period). Following is an example which further illustrates this problem:
Assume a flat tariff: service add-on+active service 1+active service 2=1 Gb. This can trigger selection of a bearer for 1 Gb.
Tariff Service Limits:
Service add-on: 400 Mb
Active Service 1: 500 Mb
Active Service 2: 300 Mb
The user's UE/MS 208 starts running these services and, at a certain point in time, the user's UE/MS 208 has consumed:
Service add-on: 200 Mb
Active Service 1: 500 Mb
Active Service 2: 100 Mb
At this point in time, service throttling is applied to active service 1 because it has reached its individual limit of 500 Mb. Service throttling does not apply yet to the service add-on and active service 2, and bearer throttling does not apply because the overall limit of 1 Gb has not been reached. This is illustrated in FIG. 2's non-problematic case.
The user's UE/MS 208 continues running these three services and, at a certain point in time, the user's UE/MS 208 has consumed:
Service add-on: 250 Mb
Active Service 1: 600 Mb (the latest 100 Mb with slower bandwidth)
Active Service 2: 150 Mb
At this point in time, service throttling is still applied to active service 1 because it has surpassed its individual limit. Service throttling does not apply yet to service add-on and active service 2 because they have not reached individual limit. However, since the overall consumption has reached 1 Gb (600 Mb+150 Mb+250 Mb) bearer throttling must be applied to service add-on, active service 1 and active service 2. This is illustrated in FIG. 2's problematic case.

As can be appreciated, the problem with the current-state-of-the-art is that, by limiting the bearer bandwidth for all services, the active service add-on(s) are also limited even if its individual limiting conditions have not yet been reached, and the end user perception is that the tariff agreements are not being respected for their service add-on(s). This negative end user perception can negatively affect the deployment of service add-on(s) as currently offered. Accordingly, there is a need to address these problems and other problems associated with the current PCEF 104, TDF 106, and PCRF 102. This need and other needs are satisfied by the present invention.

SUMMARY

A policy server (e.g., PCRF), a policy enforcement device (e.g., PCEF, TDF), and various methods which address the aforementioned problem and other problems are described in the independent claims of the present application. Advantageous embodiments of the policy server, the policy enforcement device, and the various methods have been described in the dependent claims of the present application.

In one aspect, the present invention comprises a policy server (e.g., PCRF) configured to interact with a policy enforcement device (e.g., PCEF, TDF) to dynamically exclude active service add-ons from bearer throttling for a user terminal. In one embodiment, the policy server comprises at least one processor and at least one memory that stores processor-executable instructions, wherein the at least one processor interfaces with the at least one memory to execute the processor-executable instructions, whereby the policy server is operable to implement a receiving operation, an obtaining operation, and an initiating operation. In the receiving operation, the policy server receives a request for rules, where the request comprises an identifier of the user terminal. In the obtaining operation, the policy server obtains subscriber information corresponding to the user terminal, where the subscriber information is obtained by using the identifier of the user terminal and indicates there is a service add-on which is currently active for the user terminal. In the initiating operation, the policy server initiates rules for the user terminal in the policy enforcement device, where the rules which are based at least in part on the subscriber information indicate that the service add-on is to be excluded from bearer throttling for the user terminal. The policy server has an advantage in that it allows general data packages to co-exist with service add-ons.

In particular, the service add-on indicates that bandwidth of service traffic associated with a corresponding service is to be limited to a defined value after the user terminal consumes a defined amount of data associated with the corresponding service during a defined time period, and the bearer throttling entails limiting the bearer bandwidth to the defined value after the user terminal has consumed the defined amount of data during the defined time period.

Particularly advantageous for the case where the defined period has expired for the service add-on, amongst other cases, the policy server may be operable to implement a detecting operation, a modifying operation, and a further initiating operation. In the detecting operation, the policy server detects that the service add-on is no longer currently active for the user terminal. In the modifying operation, the policy server modifies the rules to indicate that the service add-on is not to be excluded from the bearer throttling for the user terminal. In the further initiating operation, the policy server initiates the modified rules for the user terminal in the policy enforcement device.

In another aspect, the present invention comprises a method in a policy server (e.g., PCRF) which interacts with a policy enforcement device (e.g., PCEF, TDF) to dynamically exclude active service add-ons from bearer throttling for a user terminal. In one embodiment, the method comprises a receiving operation, an obtaining operation, and an initiating operation. In the receiving operation, the policy server receives a request for rules, where the request comprises an identifier of the user terminal. In the obtaining operation, the policy server obtains subscriber information corresponding to the user terminal, where the subscriber information is obtained by using the identifier of the user terminal and indicates there is a service add-on which is currently active for the user terminal. In the initiating operation, the policy server initiates rules for the user terminal in the policy enforcement device, where the rules which are based at least in part on the subscriber information indicate that the service add-on is to be excluded from bearer throttling for the user terminal. The method has an advantage in that it allows general data packages to co-exist with service add-ons.

As particularly commented above, the service add-on indicates that bandwidth of service traffic associated with a corresponding service is to be limited to a defined value after the user terminal consumes a defined amount of data associated with the corresponding service during a defined time period, and the bearer throttling entails limiting the bearer bandwidth to the defined value after the user terminal has consumed the defined amount of data during the defined time period.

Particularly advantageous for the case where the defined period has expired for the service add-on, amongst other cases, the policy server may be operable to implement a detecting operation, a modifying operation, and a further initiating operation. In the detecting operation, the policy server detects that the service add-on is no longer currently active for the user terminal. In the modifying operation, the policy server modifies the rules to indicate that the service add-on is not to be excluded from the bearer throttling for the user terminal. In the further initiating operation, the policy server initiates the modified rules for the user terminal in the policy enforcement device.

In another aspect, the present invention comprises a policy enforcement device (e.g., PCEF, TDF) configured to interact with a policy server (e.g., PCRF) to dynamically exclude active service add-ons from bearer throttling for a user terminal. In one embodiment, the policy enforcement device comprises at least one processor and at least one memory that stores processor-executable instructions, wherein the at least one processor interfaces with the at least one memory to execute the processor-executable instructions, whereby the policy enforcement device is operable to implement an obtaining operation, a detecting operation, and a determining operation. In the obtaining operation, the policy enforcement device obtains rules for the user terminal from the policy server, where the rules indicate that a service add-on is to be excluded from bearer throttling for the user terminal. In the detecting operation, the policy enforcement device detects service traffic to or from the user terminal. In the determining operation, the policy enforcement device determines if the service traffic matches the service add-on and wherein (1) if the service traffic matches the service add-on, then the policy enforcement device applies enforcement actions in the rules such that the service traffic of the service add-on is excluded from the bearer throttling for the user terminal, or (2) if the service traffic does not match the service add-on, then the policy enforcement device applies enforcement actions in the rules such that the service traffic is not excluded from the bearer throttling for the user terminal. The policy enforcement device has an advantage in that it allows general data packages to co-exist with service add-ons.

In a particular embodiment, for example where the policy enforcement device implements a PCEF, the policy enforcement device may be operable to send a request for rules to the policy server upon a session establishment for the user terminal, wherein the request comprises an identifier of the user terminal.

Also advantageous for the case where the defined period has expired for the service add-on, amongst other cases, the policy enforcement device may be operable to implement an obtaining operation, and an applying operation. In the obtaining operation, the policy enforcement device obtains modified rules for the user terminal from the policy server, wherein the modified rules now indicate that the service add-on is not to be excluded from the bearer throttling for the user terminal. In the applying operation, the policy enforcement device applies enforcement actions in the modified rules such that the service traffic of the service add-on is not excluded from the bearer throttling for the user terminal.

In yet another aspect, the present invention comprises a method in a policy enforcement device (e.g., PCEF, TDF) which interacts with a policy server (e.g., PCRF) to dynamically exclude active service add-ons from bearer throttling for a user terminal. In one embodiment, the method comprises an obtaining operation, a detecting operation, and a determining operation. In the obtaining operation, the policy enforcement device obtains rules for the user terminal from the policy server, where the rules indicate that a service add-on is to be excluded from bearer throttling for the user terminal. In the detecting operation, the policy enforcement device detects service traffic to or from the user terminal. In the determining operation, the policy enforcement device determines if the service traffic matches the service add-on and wherein (1) if the service traffic matches the service add-on, then the policy enforcement device applies enforcement actions in the rules such that the service traffic of the service add-on is excluded from the bearer throttling for the user terminal, or (2) if the service traffic does not match the service add-on, then the policy enforcement device applies enforcement actions in the rules such that the service traffic is not excluded from the bearer throttling for the user terminal. The policy enforcement device has an advantage in that it allows general data packages to co-exist with service add-ons.

In a particular embodiment, for example where the policy enforcement device implements a PCEF, the method in the policy enforcement device may further comprise sending a request for rules to the policy server upon a session establishment for the user terminal, wherein the request comprises an identifier of the user terminal.

Also advantageous for the case where the defined period has expired for the service add-on, amongst other cases, the method in the policy enforcement device may comprise an obtaining operation, and an applying operation. In the obtaining operation, the policy enforcement device obtains modified rules for the user terminal from the policy server, wherein the modified rules now indicate that the service add-on is not to be excluded from the bearer throttling for the user terminal. In the applying operation, the policy enforcement device applies enforcement actions in the modified rules such that the service traffic of the service add-on is not excluded from the bearer throttling for the user terminal.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings.

DETAILED DESCRIPTION

Figure 3:
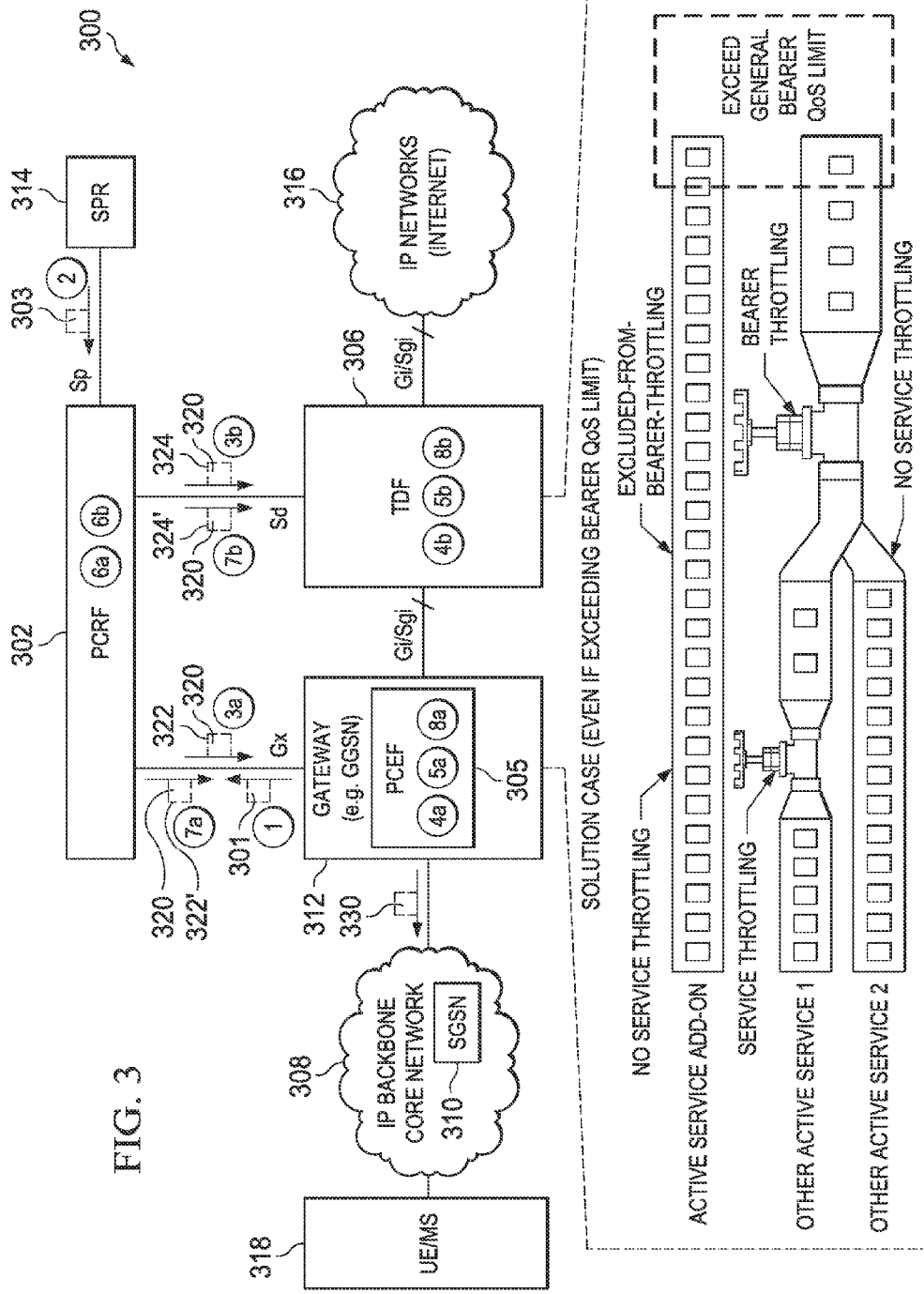
FIG. 3 is a basic diagram of a telecommunications system which incorporates a policy server (e.g., PCRF) and policy enforcement devices (e.g., PCEF and TDF) which are specially configured to address the problem associated with the current-state-of-the-art in accordance with an embodiment of the present invention.

Referring to FIG. 3, there is illustrated a basic diagram of a telecommunications system 300 which incorporates a specially configured policy server 302 (e.g., PCRF 302) and specially configured policy enforcement devices 305 and 306 (e.g., PCEF 305 and TDF 306) in accordance with an embodiment of the present invention. The telecommunication system 300 comprises an IP Backbone Core Network 308 (includes a SGSN 310), a gateway 312 (includes the specially configured PCEF 305), the specialty configured PCRF 302, a SPR 314, the specially configured TDF 306, and IP networks 316 (internet 316). As shown, the end user's UE/MS 318 connects to the IP Backbone Core Network 308 (includes the SGSN 310) which is connected to the gateway 312 (includes the PCEF 305). The gateway 312 (e.g., GGSN 312) is connected to the PCRF 302 and the TDF 306 respectively by the Gx reference point and a Gi/Sgi reference point. Also, the PCRF 302 is connected to the SPR 314 and the TDF 306 respectively by a Sp reference point and a Sd reference point. The TDF 306 is connected to the IP networks 316 (internet 316) by the Gi/Sgi reference point. It should be appreciated that the telecommunication system 300 includes many other components but for clarity only the components needed to help explain and enable the present invention have been described herein. Furthermore, although the description provided herein is based on using an Evolved 3GPP Packet Switched domain it should be appreciated that the present invention can be implemented in any type of domain which is configured to provide bearer throttling and service throttling.

As will be discussed in greater detail below, an idea of the present invention is to configure the PCRF 302 to control the throttling functionalities performed by the PCEF 305 or the TDF 306 to specifically exclude certain services namely active service add-ons (not to be confused with active services) from bearer throttling by using some type of indication such as, for example, a new parameter 320 (herein called the Exclude-From-Bearer-Throttling AVP 320) in PCC rules 322 which are sent to the PCEF 305 or in ADC rules 324 which are sent to the TDF 306. In general, this can be accomplished as follows:

1. Upon the IP-CAN session establishment by the user's UE/MS 308, the PCEF 305 sends a request 301 (which includes a user indentifier) for rules 322 or 324 to the PCRF 302 (FIG. 3's step 1.
2. The PCRF 302 sends the user identifier to the SPR 314 to retrieve subscriber information 303 which includes information about any active service add-on(s) (e.g., Facebook add-on) which are associated with the user (FIG. 3's step 2).
3. The PCRF 302 uses the retrieved subscriber information 303 about the user to install or activate the new Exclude-From-Bearer-Throttling AVP 320 which corresponds to the retrieved service add-on(s) in the PCC rules 322 which are sent to the PCEF 305 (FIG. 3's step 3a) or in the ADC rules 324 which are sent to the TDF 306 (FIG. 3's step 3b).
4. The PCEF 305 activates the PCC rules 322 (FIG. 3's step 4a) or the TDF 306 activates the ADC rules 324 (FIG. 3's step 4b).
5. The PCEF 305 or the TDF 306 upon detecting a particular service request (service traffic) to or from the user's UE/MS 318 when the service request's TDF-Application-Identifier matches the PCC rules 322 or ADC rules 324 or the Flow-Information matches the PCC rules 322 (according to rule definition) will then implement the enforcement actions indicated by the PCC rules 322 or the ADC rules 324 so as not to specifically apply bearer throttling to the packets classified into the service add-on (FIG. 3's step 5a or step 5b).

Note: In this situation, the PCEF 305 is aware of the fact that the resulting default bearer QoS could be higher since certain service add-on(s) (Facebook in the example) are excluded from the bearer throttling, so that the default bearer should be able to bear higher load than was first expected. Hence, the PCEF 305 could make the appropriate modifications for the default bearer QoS by for example triggering a default bearer QoS modification signal 330 towards the SGSN 310 and/or other relevant radio elements.

6-7. At any time during the IP-CAN session, in case the service add-on(s) terminate (e.g., by expiration or the user unsubscribes to the service add-on(s)), the PCRF 302 will modify the PCC rules 322 or ADC rules 324 by deactivating or removing the Exclude-From-Bearer-Throttling AVP 320 (FIG. 3's step 6a or step 6b). Then, the PCRF 302 will send the modified PCC rules 322' or ADC rules 324' to the PCEF 305 or the TDF 306 (FIG. 3's step 7a or 7b).

8. The PCEF 305 or the TDF 306 upon detecting further service traffic from the user's UE/MS 318 where the service traffic's TDF-Application-Identifier matches the modified PCC rules 322' or the modified ADC rules 324' or the Flow-Information matches the modified PCC rules 322' (according to rule definition) will then implement the enforcement actions indicated by the modified PCC rules 322' or the modified ADC rules 324' by applying bearer throttling to the packets classified into the service add-on (FIG. 3's step 8a or 8b).

Note: An exemplary scenario is discussed below with respect to FIGS. 6A-6C where the PCEF 305 is controlled by the PCRF 302 through the Gx PCC rules 322 and 322' to perform bearer throttling and service throttling in accordance with the present invention per FIG. 3's steps 1, 2, 3a, 4a. 5a, 6a, 7a and 8a. Plus, an exemplary scenario is discussed below with respect to FIGS. 7A-7C where the TDF 306 is controlled by the PCRF 302 through the Sd ADC rules 324 and 324' to perform bearer throttling and service throttling in accordance with the present invention per FIG. 3's steps 1, 2, 3b, 4b, 5b, 6b, 7b and 8b.

Figure 1:
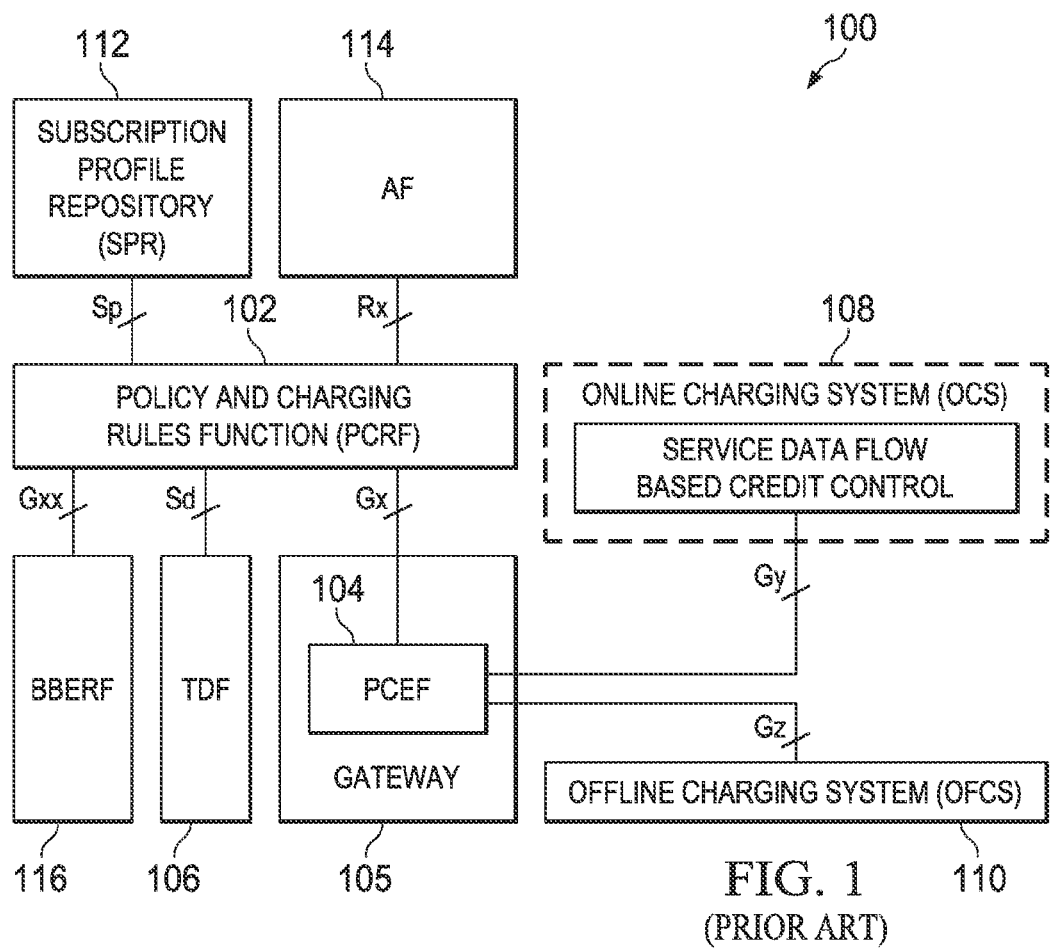
FIG. 1 (PRIOR ART) illustrates one of the PCC architectures disclosed in 3GPP TS 23.203 (version V12.4.0; March-2014)
Figure 2:
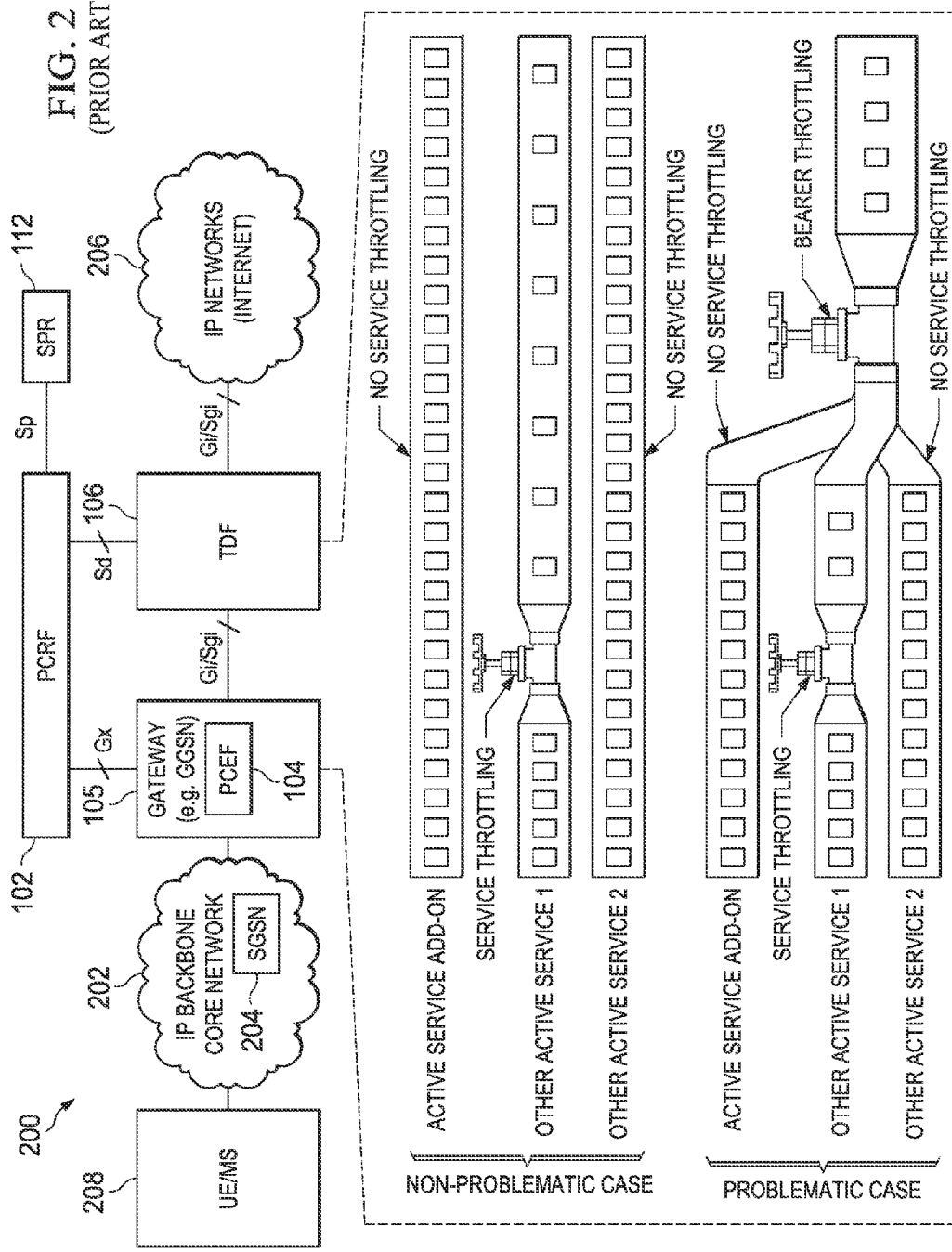
FIG. 2 (PRIOR ART) is a basic diagram of a telecommunications system which is used to help explain a problem associated with the current-state-of-the-art of certain PCC components in relation to bearer throttling (bearer bandwidth limitation) and service throttling (service bandwidth limitation)

Following is an example which illustrates the present invention's solution to the current-state-of-the-art problem: Assume a flat tariff: service add-on+active service 1+active service 2=1 Gb. This can trigger selection of a bearer for 1 Gb. Tariff Service Limits:
Service add-on: 400 Mb
Active Service 1: 500 Mb
Active Service 2: 300 Mb The user's UE/MS 318 starts running these services and, at a certain point in time, the user's UE/MS 318 has consumed:
Service add-on: 200 Mb
Active Service 1: 500 Mb
Active Service 2: 100 Mb At this point in time, service throttling is applied to active service 1 because it has reached its individual limit of 500 Mb. Service throttling does not apply yet to the service add-on and active service 2, and bearer throttling does not apply because the overall limit of 1 Gb has not been reached. This is the same situation as was illustrated in FIG. 2's non-problematic case.

The user's UE/MS 318 continues running these three services and, at a certain point in time, the user's UE/MS 318 has consumed:
Service add-on: 250 Mb
Active Service 1: 600 Mb (the latest 100 Mb with slower bandwidth)
Active Service 2: 150 Mb At this point in time, service throttling is still applied to active service 1 because it has surpassed its individual limit. Service throttling does not apply yet to the service add-on and active service 2 because they have not reached individual limit. In contrast to the prior art, since the overall consumption has reached 1 Gb (600 Mb+150 Mb+250 Mb) bearer throttling is applied to active service 1 and active service 2 but not to the active service add-on. This situation is illustrated in FIG. 3's solution case which when compared to FIG. 2's problematic case enables one to see how the problem of the prior art in which the active service add-on was subject to bearer throttling is solved in accordance with the present invention.

Figure 4:
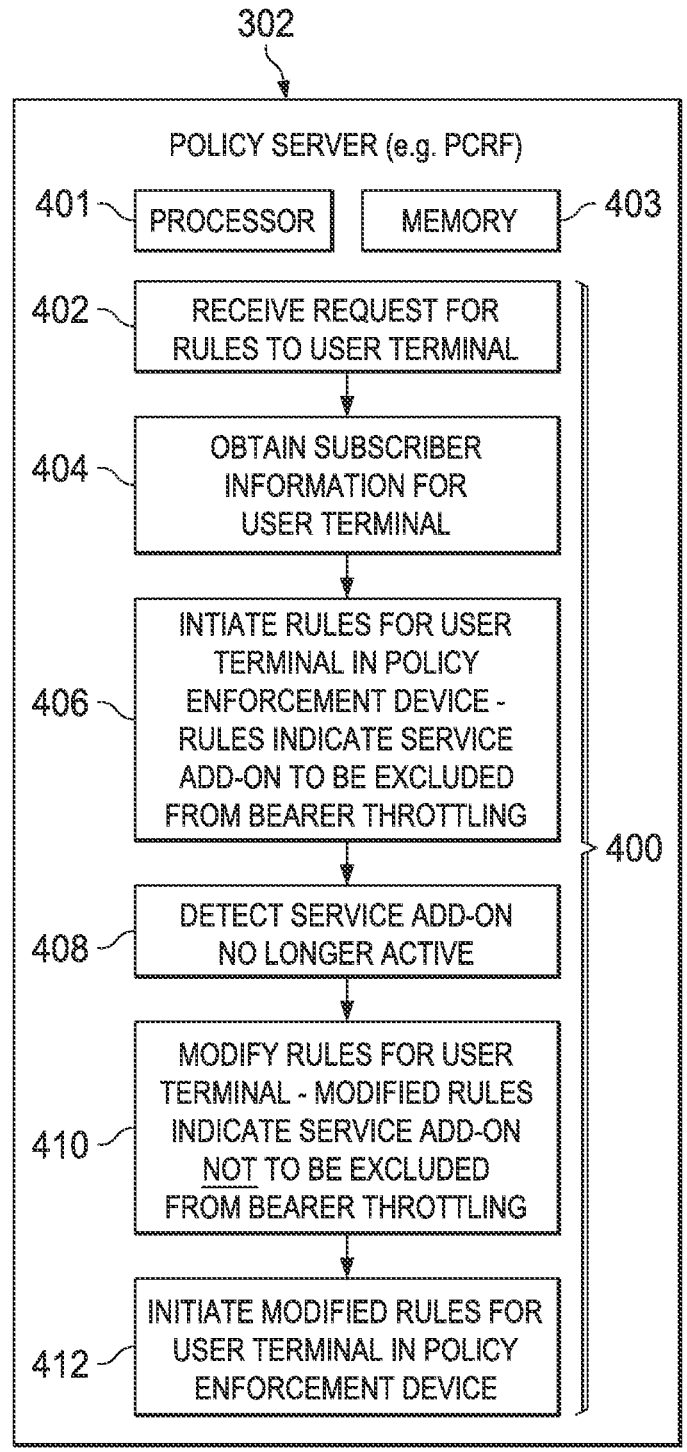
FIG. 4 is a diagram of the policy server (e.g., PCRF) which is specially configured to implement a method for interacting with a policy enforcement device (e.g., PCEF, TDF) to dynamically exclude active service add-ons from bearer throttling for a user terminal in accordance with an embodiment of the present invention.

Referring to FIG. 4, there is a diagram of the policy server 302 (e.g., PCRF 302) which is specially configured to implement a method 400 to interact with the policy enforcement device 305 or 306 (e.g., PCEF 305, TDF 306) and dynamically exclude active service add-ons from bearer throttling for the user terminal 318 in accordance with an embodiment of the present invention. As shown, the policy server 302 (e.g., PCRF 302) includes at least one processor 401 and at least memory 403 that stores processor-executable instructions, wherein the at least one processor 401 interfaces with the at least one memory 403 to execute the processor-executable instructions to implement at least a portion of method 400's steps 402, 404, 406, 408, 410 and 412. Beginning at step 402, policy server 302 receives a request 301 for rules 322 or 324, where the request 301 includes an identifier of the user terminal 318 (FIG. 3's step 1). For instance, the policy server 302 can receive the request 301 for PCC rules 322 from the PCEF 305 (FIG. 3's step 1) (see also FIGS. 6-7). At step 404, the policy server 302 obtains subscriber information 303 corresponding to the user terminal 318, where the subscriber information 303 is obtained by using the identifier of the user terminal 318 and indicates there is a service add-on which is currently active for the user terminal 318 (FIG. 3's step 2). The subscriber information 303 can also indicate that the bandwidth associated with the service (e.g., Facebook service) corresponding to the service add-on is to be limited to a defined value (e.g., X Kbps) after the user terminal 318 consumes a defined amount of data (e.g., Y MBs) associated with the corresponding service of the service add-on during a defined time period (e.g., 1 month). At step 406, the policy server 302 initiates (activates and/or sends) the rules 322 or 324 for the user terminal 318 in the policy enforcement device 305 or 306 (FIG. 3's step 3a or step 3b). The rules 322 or 324, which are based at least in part on the subscriber information 303, contain an indication such as, for example, the parameter 320 (e.g., Exclude-From-Bearer-Throttling AVP 320 set to ON) to indicate that the service add-on is to be excluded from bearer throttling for the user terminal 318. At step 408, the policy server 302 at some time after initiating the rules 322 or 324 detects that the service add-on is no longer active for the user terminal 318 (FIG. 3's step 6a or step 6b). For instance, the policy server 302 can detect that the service add-on is no longer active due to the expiration of a predefined time period or the user terminal 318 has consumed an allocated volume of the service associated with the service add-on. At step 410, the policy server 302 after detecting that the service add-on is no longer active modifies the rules 322 or 324 to indicate that the service add-on is not to be excluded from the bearer throttling for the user terminal 318 (e.g., Exclude-From-Bearer-Throttling AVP 320 set to OFF) (FIG. 3's step 6a or step 6b). At step 412, the policy server 302 initiates (activates and/or sends) the modified rules 322 or 324 for the user terminal 318 in the policy enforcement device 305 or 306 (FIG. 3's step 7a or step 7b).

Figure 5:
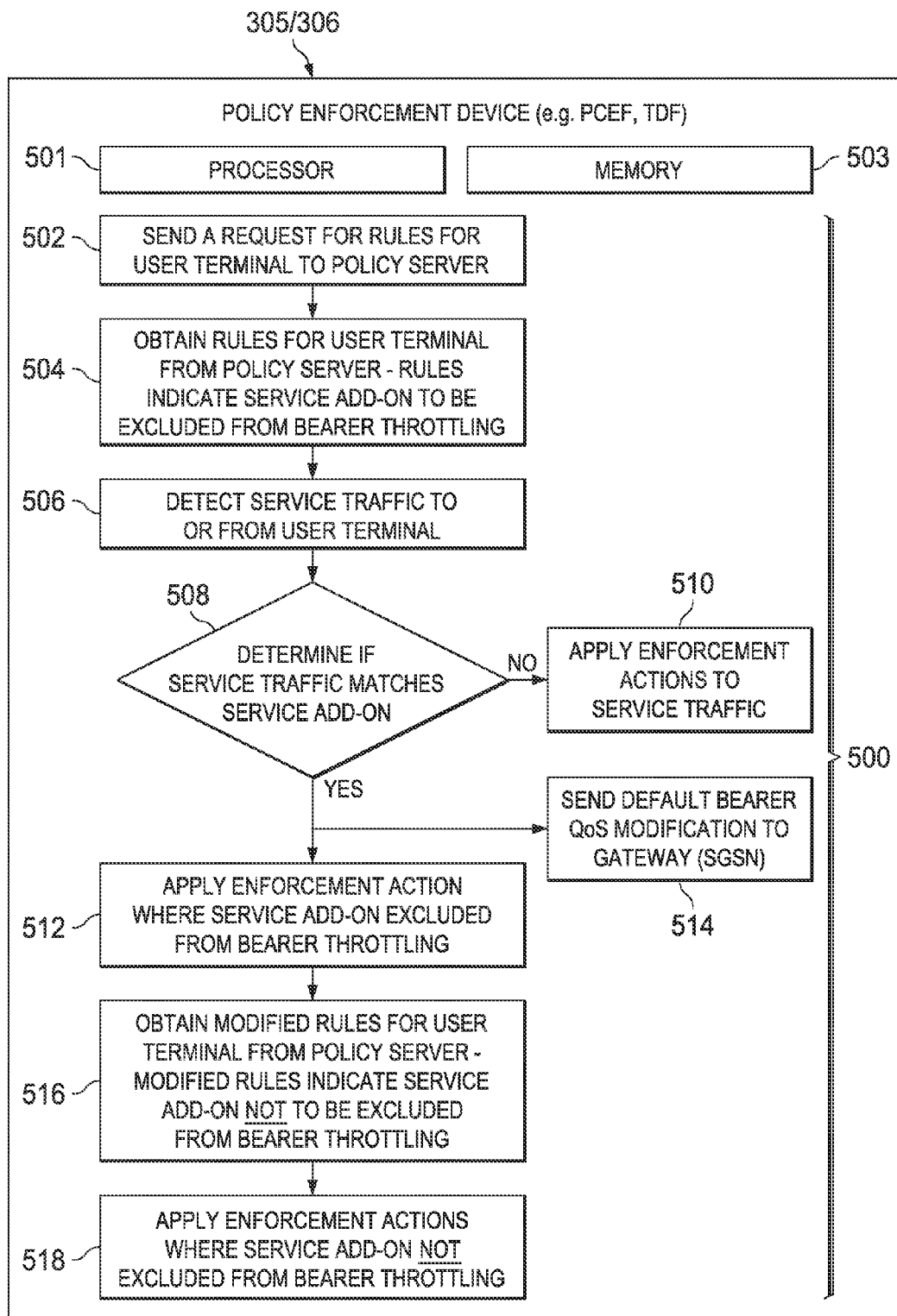
FIG. 5 is a diagram of the policy enforcement device (e.g., PCEF, TDF) which is specially configured to implement a method for interacting with a policy server (e.g., PCRF) to dynamically exclude active service add-ons from bearer throttling for a user terminal in accordance with an embodiment of the present invention.

Referring to FIG. 5, there is a diagram of the policy enforcement device 305 or 306 (e.g., PCEF 305, TDF 306) which is specially configured to implement a method 500 to interact with the policy server 302 (e.g., PCRF 302) and dynamically exclude active service add-ons from bearer throttling for a user terminal 318 in accordance with an embodiment of the present invention. As shown, the policy enforcement device 305 or 306 (e.g., PCEF 305, TDF 306) includes at least one processor 501 and at least one memory 503 that stores processor-executable instructions, wherein the at least one processor 501 interfaces with the at least one memory 503 to execute the processor-executable instructions to implement at least a portion of method 500's steps 502, 504, 506, 510, 512, 514, 516 and 518. Beginning at step 502, the policy enforcement device 305 upon a session establishment for the user terminal 318 sends a request 301 (which includes an identifier of the user terminal 318) for rules 322 or 324 to the policy server 302 (FIG. 3's step 1) (note: the PCEF 305 may perform step 502 while the TDF 306 may not perform step 502). At step 504, the policy enforcement device 305 or 306 obtains (receives) rules 322 or 324 for the user terminal 318 from the policy server 302 (FIG. 3's step 3a or step 3b). The rules 322 or 324 contain an indication such as, for example, the parameter 320 (e.g., Exclude-From-Bearer-Throttling AVP 320 set to ON) to indicate that a service add-on is to be excluded from bearer throttling for the user terminal 318. At step 506, the policy enforcement device 305 or 306 detects service traffic (service request) from the user terminal 318 (FIG. 3's step 5a or step 5b). At step 508, the policy enforcement device 305 or 306 determines if the service traffic matches the service add-on (FIG. 3's step 5a or step 5b). If the service traffic does not match the service add-on, then at step 510 the policy enforcement device 305 or 306 applies enforcement actions in the rules 322 or 324 such that the service traffic is not excluded from the bearer throttling for the user terminal 318 (FIG. 3's step 5a or step 5b). If the service traffic matches the service add-on, then at step 512 the policy enforcement device 305 or 306 applies enforcement actions in the rules 322 or 324 such that the service traffic of the service add-on is excluded from the bearer throttling for the user terminal 314 (FIG. 3's step Sa or step 5b). At step 514, the policy enforcement device 305 upon determining that the service traffic matches the service add-on will also send a default bearer quality-of-service modification 330 towards an entity (e.g., SGSN 310) handling resources for the default bearer (see FIG. 3). The default bearer quality-of-service modification 330 indicates a higher load is possible than a currently set load for the default bearer due to the service add-on being excluded from the bearer throttling for the default bearer quality-of-service. At some point in time after step 512, the policy enforcement device 305 or 306 at step 516 can obtain (receive) modified rules 322' or 324' for the user terminal 318 from the policy server 302 (FIG. 3's step 7a or step 7b). The modified rules 322' or 324' now indicate that the service add-on is not active and is not to be excluded from the bearer throttling for the user terminal 318 (e.g., Exclude-From-Bearer-Throttling AVP 320 set to OFF). At step 518, the policy enforcement device 305 or 306 applies enforcement actions in the modified rules 322' or 324' such that the service traffic of the service add-on is not excluded from the bearer throttling for the user terminal 318 (FIG. 3's step 8a or step 8b).

Figure 6A:
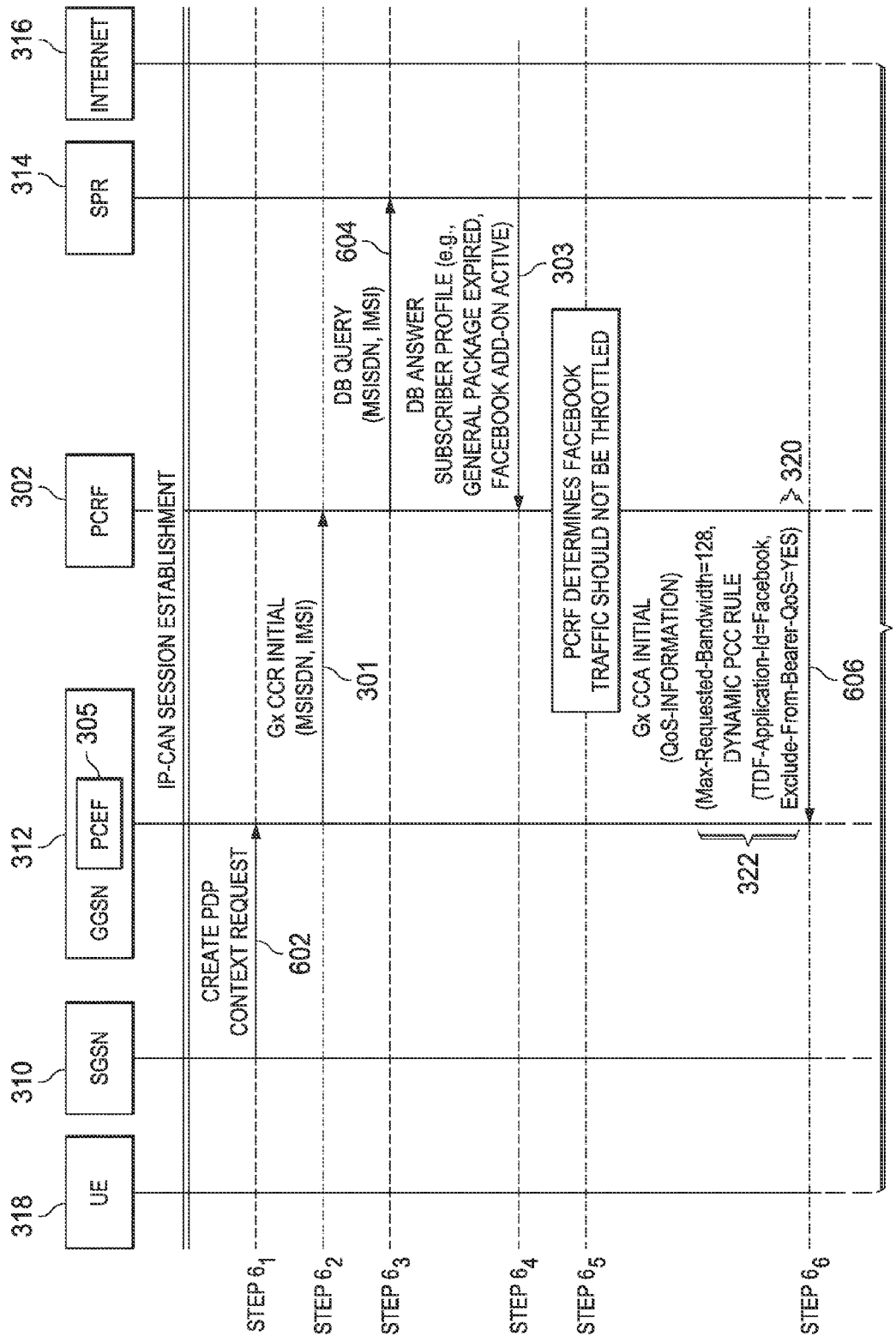
FIGS. 6A-6C illustrate an exemplary signal flow diagram where the specially configured PCEF is controlled by the specially configured PCRF through PCC rules to perform bearer throttling and service throttling in accordance with an embodiment of the present invention.
Figure 6B:
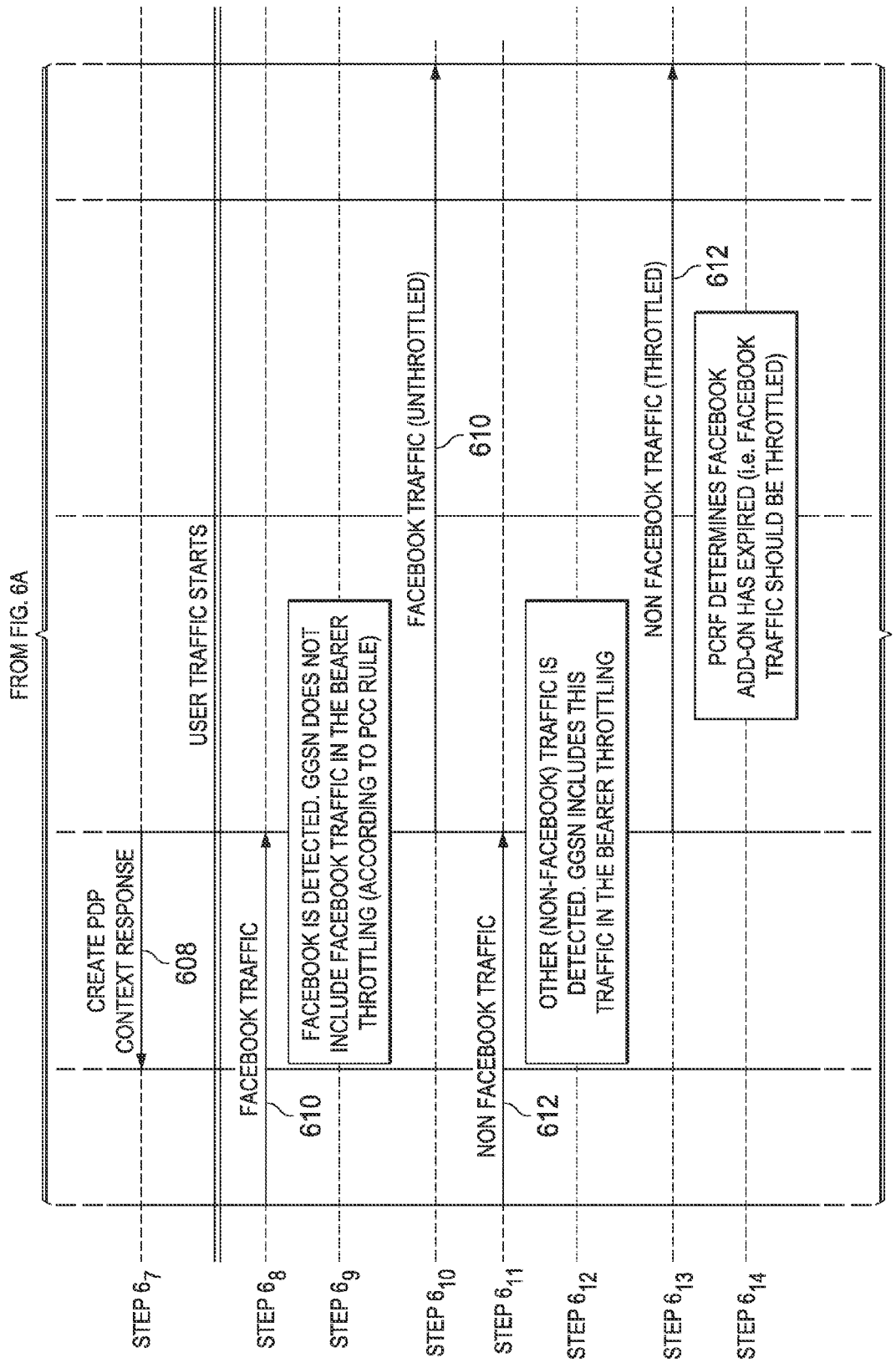
Figure 6C:
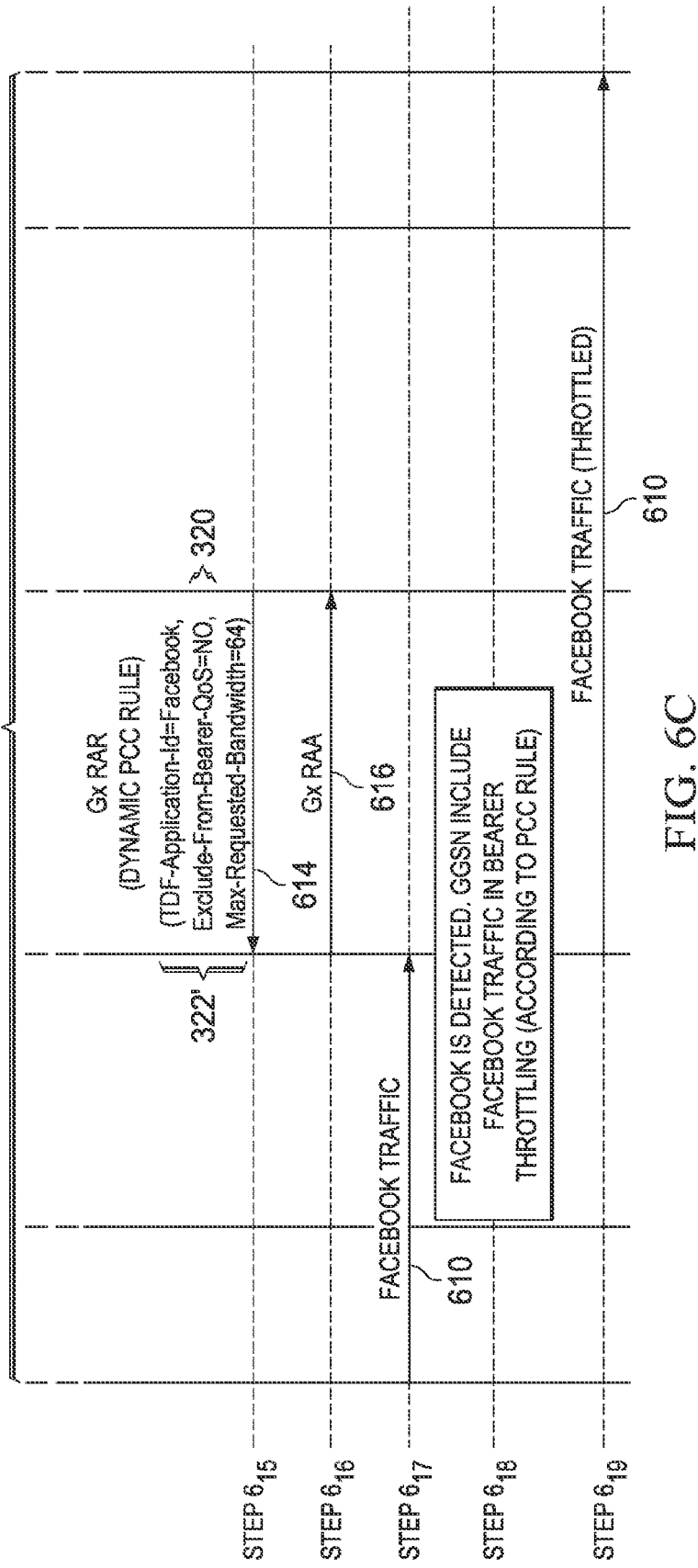

Referring to FIGS. 6A-6C, there is an exemplary signal flow diagram illustrating steps where the PCEF 305 (part of the GGSN 312) is controlled by the PCRF 302 through Gx PCC rules 322 and 322' to perform bearer throttling and service throttling in accordance with an embodiment of the present invention. In this exemplary scenario, the user's UE 318, the SGSN 310, the PCEF 305 (part of the GGSN 312), the PCRF 302, the SPR 314 and the Internet 316 interact with one another per the following steps:

Steps $6_1$ and $6_2$: In 3G networks, the SGSN 310 upon IP-CAN session establishment sends a Create PDP Context Request 602 to the PCEF 305 (GGSN 312) (step $6_1$) The PCEF 305 (GGSN 312) conveys to PCRF 302 the subscriber identity (IMSI or MSISDN) of the UE 318 in a Gx CCR initial message 301 (step $6_2$). This is as per current standards.

Steps $6_3$ and $6_4$: The PCRF 302 based on the received subscriber identity (IMSI or MSISDN) sends a query 604 to the SPR 314 to retrieve the subscriber's profile 303 from the SPR 314. The retrieved subscriber's profile 303 indicates the active packages for the user's UE 318 where the active packages include the general data package and the different service add-ons. In this example, the general data package has expired but the service add-on (e.g., Facebook add-on) is still active.

Step $6_5$: The PCRF 302 determines based on the retrieved subscriber profile 303 that the Facebook traffic should not be throttled at either the bearer level or the service level.

Step $6_6$: The PCRF 302 due to step 5's determination installs a Dynamic PCC rule 322 via a Gx CCA Initial message 606 with the PCEF 305. The PCC rule 322 has a TDF-Application-Identifier AVP set to Facebook and the new Exclude-From-Bearer-Throttling AVP 320 set to YES (i.e. to exclude Facebook traffic from bearer throttling). In particular, the Dynamic PCC rule 322 may contain the following parameters:

Charging-Rule-Definition::=<AVP Header: 1003>
{Charging-Rule-Name}
[Service-Identifier]
[Rating-Group]
[Flow-Information]
[TDF-Application-Identifier]
[Flow-Status]
[QoS-Information]
[PS-to-CS-Session-Continuity]
[Reporting-Level]
[Online]
[Offline]
[Metering-Method]
[Precedence]
[AF-Charging-Identifier]
*[Flows]
[Monitoring-Key]
[Redirect-Information]
[Mute-Notification]
[AF-Signalling-Protocol]
[Sponsor-Identity]
[Application-Service-Provider-Identity]
[Required-Access-Info]
[Exclude-From-Bearer-Throttling AVP 320]

Step $6_7$: The PCEF 305 sends a Create PDP Context Response 608 to the SGSN 310 to establish the IP-CAN session so that user traffic can start between the user's UE 318 and the internet 316.

Step $6_8$: User's UE 318 starts Facebook traffic 610.

Step $6_9$: The PCEF 305 detects the Facebook traffic 610 from the user's UE 318. In particular, the PCEF 305 detects Facebook traffic 610 by classifying it into TDF-Application-Identifier=Facebook which corresponds to the installed Dynamic PCC rule 322 discussed in Step 6. The Dynamic PCC rule 322 indicates that the PCEF 305 is to exclude Facebook traffic 610 from bearer throttling. Recall: the general data package has expired but the service add-on (e.g., Facebook add-on) is still active.

Step $6_{10}$: The PCEF 305 does not throttle the Facebook traffic 610 with the Internet 316.

Step $6_{11}$: User's UE 318 starts running non-Facebook traffic 612.

Step $6_{12}$: PCEF 305 detects the non-Facebook traffic 612 from the user's UE 318. The PCEF 305 includes this non-Facebook traffic 612 in bearer throttling. Recall: the general data package has expired but the service add-on (e.g., Facebook add-on) is still active.

Step $6_{13}$: The PCEF 305 throttles (limits bearer bandwidth) the non-Facebook traffic 612 with the Internet 316.

Step $6_{14}$: The PCRF 302 detects that the Facebook add-on has expired (e.g. due to monthly expiration or the user's UE 318 has consumed the allocated Facebook volume, e.g. 100

MB) which means that Facebook traffic 610 needs to be throttled (both on a per bearer and service basis).

Step $6_{15}$: The PCRF 302 after step 14 triggers a Gx RAR 614 to initiate a modified Dynamic PCC rule 322' with the PCEF 305. The exemplary modified Dynamic PCC rule 322' has at least the following parameters:
  TDF-Application-Identifier AVP set to Facebook
  Exclude-From-Bearer-Throttling AVP 320 set to NO (i.e. to include Facebook traffic for bearer throttling).
  Max-Requested-Bandwidth AVP set to 64 kbps (to throttle Facebook traffic to 64 kbps, as the Facebook add-on is expired).

Step $6_{16}$: The PCEF 305 acknowledges the receipt of the modified Dynamic PCC rule 322' by sending a Gx RAA message 616 to the PCRF 302.

Step $6_{17}$: User's UE 318 continues to use Facebook traffic 610.

Step $6_{18}$: The PCEF 305 detects the Facebook traffic 610 from the user's UE 318. In particular, the PCEF 305 detects Facebook traffic 610 by classifying it into TDF-Application-Identifier=Facebook which corresponds to the installed Dynamic PCC rule 322' discussed in Step 15. The Dynamic PCC rule 322' indicates that the PCEF 305 is to include Facebook traffic with bearer throttling and to throttle Facebook traffic (on a per service basis) to 64 kbps.

Step $6_{19}$: Facebook traffic 610 is throttled by the PCEF 305.

Note 1: the above exemplary scenario utilizes Dynamic PCC rules 322 and 322'.

However, it is also possible to indicate the service exclusion from bearer throttling as part of a Pre-Defined PCC rule. It should also be noted that all the parameters of the pre-defined PCC rule would be locally configured in the PCEF 305.

Note 2: This exemplary scenario also applies to a 3GPP Rel11 compliant PCEF 305 enhanced with ADC functionality (e.g. GGSN or PGW with DPI capabilities).

Figure 7A:
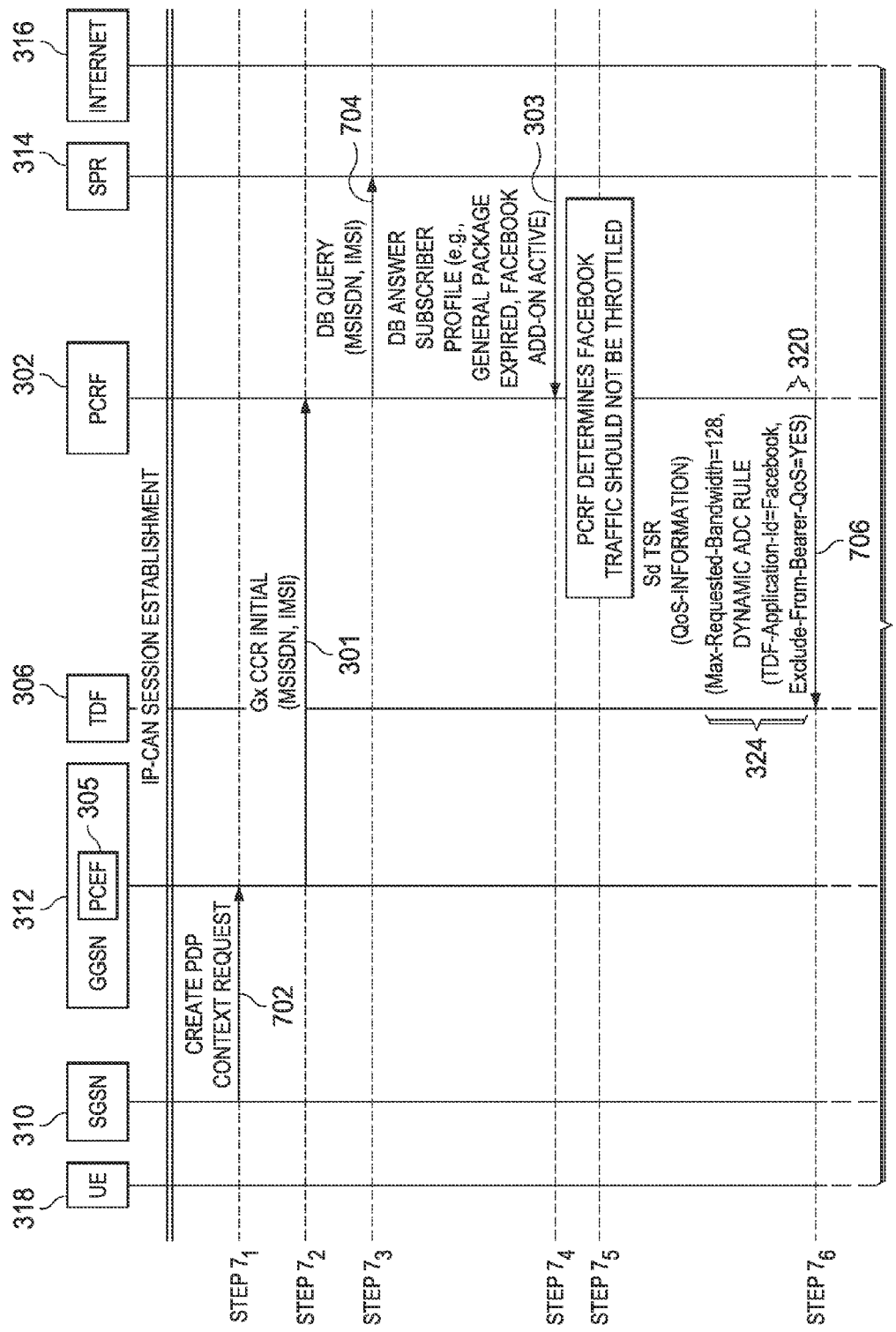
FIGS. 7A-7C illustrates an exemplary signal flow diagram where the specially configured TDF is controlled by the specially configured PCRF through ADC rules to perform bearer throttling and service throttling in accordance with an embodiment of the present invention.
Figure 7B:
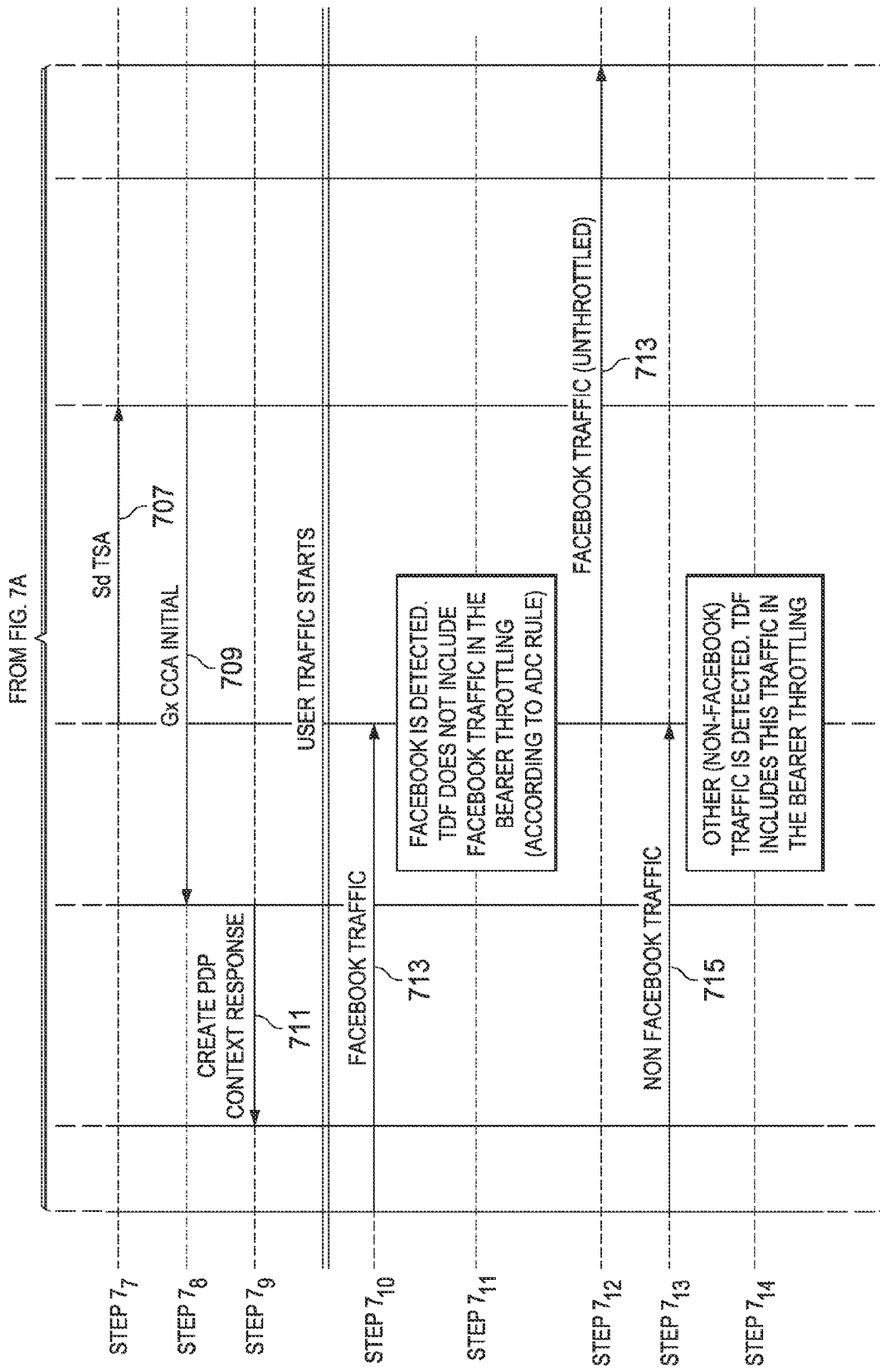
Figure 7C:
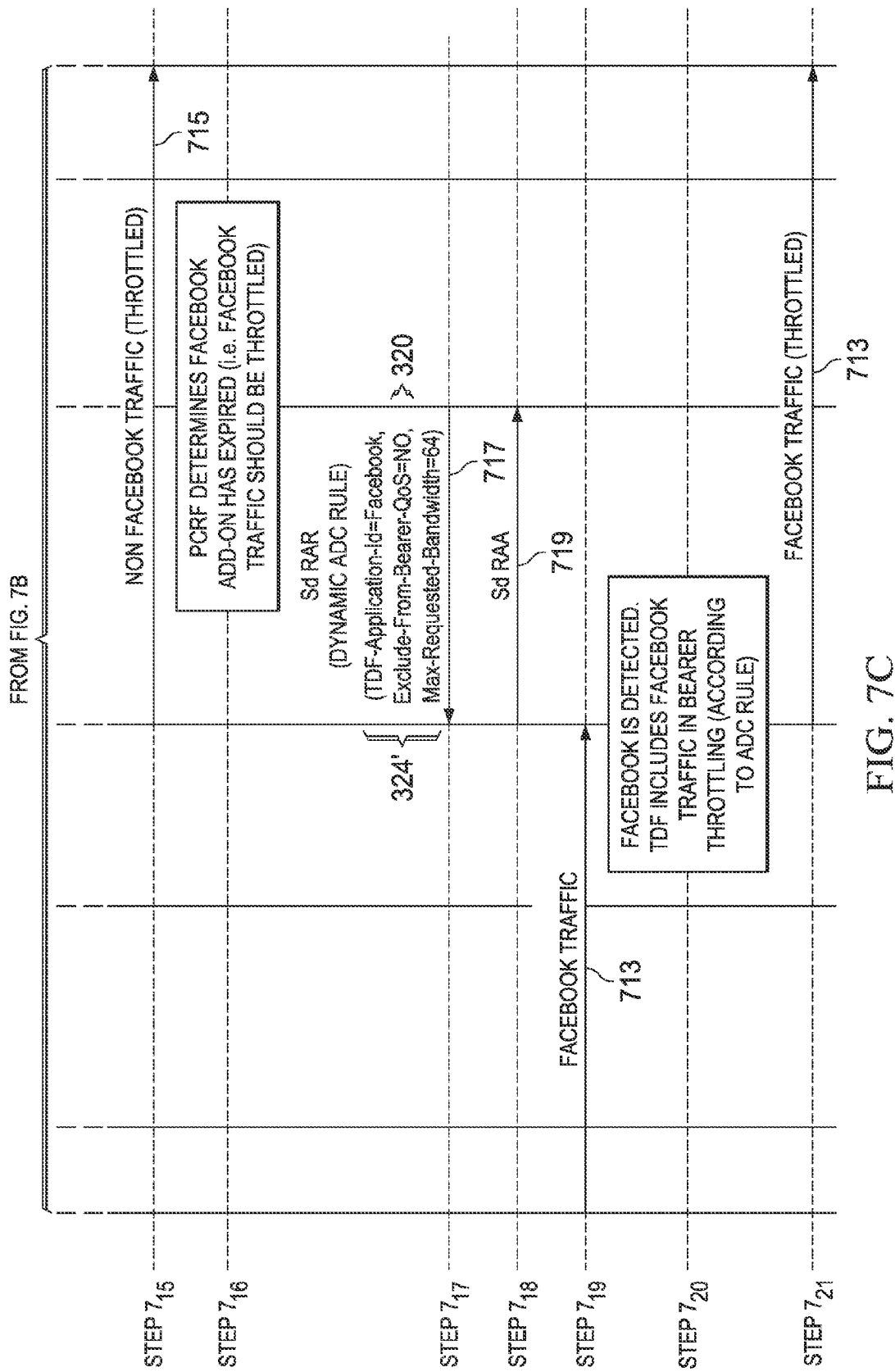

Referring to FIGS. 7A-7C, there is an exemplary signal flow diagram illustrating steps where the TDF 306 is controlled by the PCRF 302 through Sd ADC rules 324 and 324' to perform bearer throttling and service throttling in accordance with an embodiment of the present invention. In this exemplary scenario, the user's UE 318, the SGSN 310, the PCEF 305 (part of the GGSN 312), the TDF 305, the PCRF 302, the SPR 314 and the Internet 316 interact with one another per the following steps:

Steps $7_1$ and $7_2$: In 3G networks, the SGSN 310 upon IP-CAN session establishment sends a Create PDP Context Request 702 to the PCEF 305 (GGSN 312) (step $7_1$). The PCEF 305 (GGSN 312) conveys to PCRF 302 the subscriber identity (IMSI or MSISDN) of the UE 318 in a Gx initial CCR message 301 (step $7_2$). This is as per current standards.

Steps $7_3$ and $7_4$: The PCRF 302 based on the received subscriber identity (IMSI or MSISDN) sends a query 704 to the SPR 314 to retrieve the subscriber's profile 303 from the SPR 314. The retrieved subscriber's profile 303 indicates the active packages for the user's UE 318 where the active packages include the general data package and the different service add-ons. In this example, the general data package has expired but the service add-on (e.g., Facebook add-on) is still active.

Step $7_5$: The PCRF 302 determines based on the retrieved subscriber profile 303 that the Facebook traffic should not be throttled at either the bearer level or the service level.

Step $7_6$: The PCRF 302 due to step 5's determination installs a Dynamic ADC rule 324 via a Sd TSR 706 with the TDF 306. The ADC rule 324 has a TDF-Application-Identifier AVP set to Facebook and the new Exclude-From-Bearer-Throttling AVP 320 set to YES (i.e. to exclude Facebook traffic from bearer throttling). In particular, the Dynamic ADC rule 324 may contain the following parameters:
  ADC-Rule-Definition::=<AVP Header: 1094>
  {ADC-Rule-Name}
  [TDF-Application-Identifier]
  [Flow-Status]
  [QoS-Information]
  [Monitoring-Key]
  [Redirect-Information]
  [Mute-Notification]
  [Exclude-From-Bearer-Throttling AVP 320]

Step $7_7$: The TDF 306 sends a Sd TSA message 707 to the PCRF 302.

Step $7_8$: The PCRF 302 sends a Gx CCA Initial message 709 (which may include the Dynamic ADC rule 324) to the PCEF 305.

Step $7_9$: The PCEF 305 sends a Create PDP Context Response 711 to the SGSN 310 to establish the IP-CAN session so that user traffic can start between the user's UE 318 and the internet 316.

Step $7_{10}$: User's UE 318 starts Facebook traffic 713.

Step $7_{11}$: The TDF 306 detects the Facebook traffic 713 from the user's UE 318. In particular, the TDF detects Facebook traffic 713 by classifying it into TDF-Application-Identifier=Facebook which corresponds to the installed Dynamic ADC rule 324 discussed in Step 6. The Dynamic ADC rule 324 indicates that the TDF 306 is to exclude Facebook traffic 713 from bearer throttling. Recall: the general data package has expired but the service add-on (e.g., Facebook add-on) is still active.

Step $7_{12}$: The TDF 306 does not throttle the Facebook traffic 713 with the Internet 316.

Step $7_{13}$: User's UE 318 starts running non-Facebook traffic 715.

Step $7_{14}$: The TDF 306 detects the non-Facebook traffic 715 from the user's UE 318. The TDF 306 includes this non-Facebook traffic 715 in bearer throttling. Recall: the general data package has expired but the service add-on (e.g., Facebook add-on) is still active.

Step $7_{15}$: The TDF 306 throttles (limits bearer bandwidth) the non-Facebook traffic 715 with the Internet 316.

Step $7_{16}$: The PCRF 302 detects that the Facebook add-on has expired (e.g. due to monthly expiration or the user's UE 318 has consumed the allocated Facebook volume, e.g. 100 MB) which means that Facebook traffic 713 needs to be throttled (both on a per bearer and service basis).

Step $7_{17}$: The PCRF 302 after step 16 triggers a Sd RAR 717 to initiate a modified Dynamic ADC rule 324' with the TDF 306. The exemplary modified Dynamic ADC rule 324' has at least the following parameters:
  TDF-Application-Identifier AVP set to Facebook
  Exclude-From-Bearer-Throttling AVP 320 set to NO (i.e. to include Facebook traffic for bearer throttling).
  Max-Requested-Bandwidth AVP set to 64 kbps (to throttle Facebook traffic to 64 kbps, as the Facebook add-on is expired)

Step $7_{18}$: The TDF 306 acknowledges receipt of the modified ADC rule 324' by sending a Sd RAA message 719 to the PCRF 302.

Step $7_{19}$: User's UE 318 continues to use Facebook traffic 713.

Step $7_{20}$: The TDF 306 detects the Facebook traffic 713 from the user's UE 318. In particular, the TDF 306 detects Facebook traffic 713 by classifying it into TDF-Application-Identifier=Facebook which corresponds to the installed Dynamic ADC rule 324' discussed in Step 17. The Dynamic ADC rule 324' indicates that the TDF 306 is to include Facebook traffic for bearer throttling and to throttle Facebook traffic (on a per service basis) to 64 kbps.

Step $7_{21}$: Facebook traffic 713 is throttled by the TDF 306.

Note 1: the above exemplary scenario utilizes Dynamic ADC rules 324 and 324'. However, it is also possible to indicate the service exclusion from bearer throttling as part of a Pre-Defined ADC rule. It should also be noted that all the parameters of the pre-defined ADC rule would be locally configured in the TDF 306.

Note 2: This exemplary scenario applies to a 3GPP Rel11 compliant TDF 306 which supports the Sd reference point with the PCRF 302.

In view of the foregoing, one will readily appreciate that the policy server 302 (e.g., PCRF 302), the policy enforcement device 305 or 306 (e.g., PCEF 305, TDF 306), and the various methods 400 and 500 described herein enable an active service add-on to be excluded from bearer throttling for user terminals. Further, one will readily appreciate that the policy server 302 (e.g., PCRF 302), the policy enforcement device 305 or 306 (e.g., PCEF 305, TDF 306), and the various methods 400 and 500 have many advantages some of which are described below:

1. Allows general data packages to co-exist with service add-ons.
2. The functionality of the present invention namely the capability to exclude an active service add-on from bearer throttling for user terminals can be easily integrated into the existing PCC architecture so as to align with the existing enforcement actions.
3. Allows the PCRF 302 to control throttling functionality in the PCEF 305 and/or the TDF 306.

Further, it should be appreciated that the policy server 302 can be a hardware device that processes software to implement functions of a PCRF. Plus, the policy enforcement device 305 or 306 can be a hardware device that processes software to implement functions of at least one of a PCEF and a TDF.

Although multiple embodiments of the present invention have been illustrated in the accompanying Drawings and described in the foregoing Detailed Description, it should be understood that the invention is not limited to the disclosed embodiments, but instead is also capable of numerous rearrangements, modifications and substitutions without departing from the present invention that as has been set forth and defined within the following claims.

The invention claimed is:

1. A policy server for initiating rules for a user terminal in a policy enforcement device, the policy server comprising:
   at least one processor; and,
   at least one memory that stores processor-executable instructions, wherein the at least one processor interfaces with the at least one memory to execute the processor-executable instructions, whereby said policy server is operable to:
      receive a request for rules, from the policy enforcement device, wherein the request comprises an identifier of the user terminal;
      obtain subscriber information corresponding to the user terminal, wherein the subscriber information is obtained by using the identifier of the user terminal and indicates a service add-on which is currently active for the user terminal; and,
      initiating rules for the user terminal in the policy enforcement device, wherein the rules, which are based at least in part on the subscriber information, indicate the service add-on,
   wherein the service add-on indicates a corresponding service, which is to be excluded from bearer throttling for the user terminal before the user terminal consumes a defined amount of data associated with the corresponding service, and which is to be included in bearer throttling by limiting bearer bandwidth of service traffic associated with the corresponding service to a defined value after the user terminal has consumed the defined amount of data associated with the corresponding service.

2. The policy server of claim 1, further operable to:
   detect that the service add-on is no longer currently active for the user terminal; and
   modify the rules to indicate that the service add-on is not to be excluded from the bearer throttling for the user terminal; and,
   initiate the modified rules for the user terminal in the policy enforcement device.

3. The policy server of claim 1, wherein:
   the service add-on indicates that the bearer throttling entails limiting the bearer bandwidth to the defined value after the user terminal has consumed the defined amount of data during a defined time period.

4. The policy server of claim 1, wherein:
   the policy server implements a Policy and Charging Rules Function (PCRF);
   the policy enforcement device implements at least one of a Policy and Charging Enforcement Function (PCEF) and a Traffic Detection Function (TDF); and,
   the rules are Policy and Charging (PCC) rules or Application Detection and Control (ADC) rules.

5. The policy server of claim 1, wherein:
   the rules comprise a parameter which indicates excluding the service corresponding to the service add-on from bearer throttling for the user terminal.

6. A method in a policy server for initiating rules for a user terminal in a policy enforcement device, the method comprising:
   receiving, by the policy server from the policy enforcement device, a request for rules, wherein the request comprises an identifier of the user terminal;
   obtaining, by the policy server, subscriber information corresponding to the user terminal, wherein the subscriber information is obtained by using the identifier of the user terminal and indicates a service add-on which is currently active for the user terminal; and,
   initiating, by the policy server, rules for the user terminal in the policy enforcement device, wherein the rules which are based at least in part on the subscriber information indicate the service add-on,
   wherein the service add-on indicates a corresponding service, which is to be excluded from bearer throttling for the user terminal before the user terminal consumes a defined amount of data associated with the corresponding service, and which is to be included in bearer throttling by limiting bearer bandwidth of service traffic associated with the corresponding service to a defined value after the user terminal has consumed the defined amount of data associated with the corresponding service.

7. The method of claim 6, further comprising:
   detecting, by the policy server, that the service add-on is no longer currently active for the user terminal;
   modifying, by the policy server, the rules to indicate that the service add-on is not to be excluded from the bearer throttling for the user terminal; and,
   initiating, by the policy server, the modified rules for the user terminal in the policy enforcement device.

8. The method of claim 6, wherein:
the service add-on indicates that the bearer throttling entails limiting the bearer bandwidth to the defined value after the user terminal has consumed the defined amount of data during a defined time period.

9. The method of claim 6, wherein:
the policy server implements a Policy and Charging Rules Function (PCRF);
the policy enforcement device implements at least one of a Policy and Charging Enforcement Function (PCEF) and a Traffic Detection Function (TDF); and,
the rules are Policy and Charging (PCC) rules or Application Detection and Control (ADC) rules.

10. The method of claim 6, wherein:
the rules comprise a parameter which indicates excluding the service corresponding to the service add-on from bearer throttling for the user terminal.

11. A policy enforcement device for obtaining rules for a user terminal from a policy server, the policy enforcement device comprising:
at least one processor; and,
at least one memory that stores processor-executable instructions, wherein the at least one processor interfaces with the at least one memory to execute the processor-executable instructions, whereby said policy enforcement device is operable to:
obtain rules for the user terminal from the policy server, wherein the rules indicate a service add-on, wherein the service add-on indicates a corresponding service, which is to be excluded from bearer throttling for the user terminal before the user terminal consumes a defined amount of data associated with the corresponding service, and which is to be included in bearer throttling by limiting bearer bandwidth of service traffic associated with the corresponding service to a defined value after the user terminal has consumed the defined amount of data associated with the corresponding service;
detect service traffic to or from the user terminal; and,
determine whether the service traffic matches the service add-on;
based on the determination that the service traffic matches the service add-on, apply enforcement actions in the rules such that the service traffic of the service add-on is excluded from, or included in, the bearer throttling for the user terminal, based on whether the user terminal has or has not consumed a defined amount of data associated with the corresponding service; or,
based on the determination that the service traffic does not match the service add-on, apply enforcement actions in the rules such that the service traffic is not excluded from the bearer throttling for the user terminal.

12. The policy enforcement device of claim 11, further operable to:
send a request for rules to the policy server upon a session establishment for the user terminal, wherein the request comprises an identifier of the user terminal.

13. The policy enforcement device of claim 11, further operable to:
based on the determination that the service traffic matches the service add-on, send a default bearer quality-of-service modification towards an entity handling resources for the default bearer, wherein the default bearer quality-of-service modification indicates a higher load is possible than a currently set load for the default bearer due to the service add-on being excluded from the bearer throttling for the default bearer quality-of-service.

14. The policy enforcement device of claim 11, further operable to:
obtain modified rules for the user terminal from the policy server, wherein the modified rules now indicate that the service add-on is not to be excluded from the bearer throttling for the user terminal; and,
apply enforcement actions in the modified rules such that the service traffic of the service add-on is not excluded from the bearer throttling for the user terminal.

15. The policy enforcement device of claim 11, wherein:
the service add-on indicates that the bearer throttling entails limiting the bearer bandwidth to the defined value after the user terminal has consumed the defined amount of data during a defined time period.

16. The policy enforcement device of claim 11, wherein:
the policy enforcement device implements at least one of a Policy and Charging Enforcement Function (PCEF) and a Traffic Detection Function (TDF);
the policy server implements a Policy and Charging Rules Function (PCRF); and,
the rules are Policy and Charging (PCC) rules or Application Detection and Control (ADC) rules.

17. The policy enforcement device of claim 11, wherein:
the rules comprise a parameter which indicates excluding the service corresponding to the service add-on from bearer throttling for the user terminal.

18. A method in a policy enforcement device for obtaining rules for a user terminal from a policy server, the method comprising:
obtaining, by the policy enforcement device, rules for the user terminal from the policy server, wherein the rules indicate a service add-on, wherein the service add-on indicates a corresponding service, which is to be excluded from bearer throttling for the user terminal before the user terminal consumes a defined amount of data associated with the corresponding service, and which is to be included in bearer throttling by limiting bearer bandwidth of service traffic associated with the corresponding service to a defined value after the user terminal has consumed the defined amount of data associated with the corresponding service;
detecting, by the policy enforcement device, service traffic to or from the user terminal; and,
determining, by the policy enforcement device, whether the service traffic matches the service add-on;
based on the determination that the service traffic matches the service add-on, applying by the policy enforcement device enforcement actions in the rules such that the service traffic of the service add-on is excluded from, or included in, the bearer throttling for the user terminal, based on whether the user terminal has or has not consumed a defined amount of data associated with the corresponding service; or,
based on the determination that the service traffic does not match the service add-on, applying by the policy enforcement device enforcement actions in the rules such that the service traffic is not excluded from the bearer throttling for the user terminal.

19. The method of claim 18, further comprising:
sending a request for rules to the policy server upon a session establishment for the user terminal, wherein the request comprises an identifier of the user terminal.

20. The method of claim 18, further comprising:
based on the determination that the service traffic matches the service add-on, sending a default bearer quality-of-service modification by the policy enforcement device towards an entity handling resources for the default bearer, wherein the default bearer quality-of-service modification indicates a higher load is possible than a currently set load for the default bearer due to the service add-on being excluded from the bearer throttling for the default bearer quality-of-service.

21. The method claim 18, further comprising:
obtaining, by the policy enforcement device, modified rules for the user terminal from the policy server, wherein the modified rules now indicate that the service add-on is not to be excluded from the bearer throttling for the user terminal; and,
applying, by the policy enforcement device, enforcement actions in the modified rules such that the service traffic of the service add-on is not excluded from the bearer throttling for the user terminal.

22. The method of claim 18, wherein:
the service add-on indicates that the bearer throttling entails limiting the bearer bandwidth to the defined value after the user terminal has consumed the defined amount of data during a defined time period.

23. The method of claim 18, wherein:
the policy enforcement device implements at least one of a Policy and Charging Enforcement Function (PCEF) and a Traffic Detection Function (TDF);
the policy server implements a Policy and Charging Rules Function (PCRF); and,
the rules are Policy and Charging (PCC) rules or Application Detection and Control (ADC) rules.

24. The method of claim 18, wherein:
the rules comprise a parameter which indicates excluding the service corresponding to the service add-on from bearer throttling for the user terminal.

* * * * *